(12) United States Patent
Takeda et al.

(10) Patent No.: US 8,976,087 B2
(45) Date of Patent: Mar. 10, 2015

(54) VIRTUAL IMAGE DISPLAY DEVICE

(71) Applicant: Seiko Epson Corporation, Tokyo (JP)

(72) Inventors: Takashi Takeda, Suwa (JP); Takahiro Totani, Suwa (JP); Akira Komatsu, Kamiina-gun (JP); Masayuki Takagi, Shiojiri (JP); Toshiaki Miyao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 248 days.

(21) Appl. No.: 13/768,475

(22) Filed: Feb. 15, 2013

(65) Prior Publication Data

US 2013/0222214 A1 Aug. 29, 2013

(30) Foreign Application Priority Data

Feb. 28, 2012 (JP) ................................. 2012-041230

(51) Int. Cl.
G09G 5/00 (2006.01)
G02B 27/01 (2006.01)
G02B 5/18 (2006.01)
G02B 26/10 (2006.01)

(52) U.S. Cl.
CPC ...... G02B 27/017 (2013.01); G02B 2027/0178 (2013.01); G02B 27/0172 (2013.01); G02B 5/18 (2013.01); G02B 26/10 (2013.01); G02B 2027/0152 (2013.01)
USPC ................................... 345/8; 345/7; 359/630

(58) Field of Classification Search
USPC .............................. 345/7, 8, 32; 359/630, 726
See application file for complete search history.

(56) References Cited

U.S. PATENT DOCUMENTS

| 5,003,300 | A | * | 3/1991 | Wells | 345/8 |
| 5,325,386 | A | * | 6/1994 | Jewell et al. | 372/50.124 |
| 5,334,991 | A | * | 8/1994 | Wells et al. | 345/8 |
| 6,967,781 | B2 | * | 11/2005 | Watanabe et al. | 359/630 |
| 2001/0010598 | A1 | * | 8/2001 | Aritake et al. | 359/630 |
| 2003/0117689 | A1 | * | 6/2003 | Helsel et al. | 359/292 |
| 2005/0234348 | A1 | * | 10/2005 | Watanabe et al. | 600/476 |
| 2005/0264502 | A1 | | 12/2005 | Sprague et al. | |
| 2007/0159599 | A1 | * | 7/2007 | Yamada | 351/211 |
| 2009/0096714 | A1 | * | 4/2009 | Yamada | 345/8 |
| 2010/0060551 | A1 | | 3/2010 | Sugiyama et al. | |
| 2011/0075104 | A1 | * | 3/2011 | Sakakibara et al. | 353/31 |

(Continued)

FOREIGN PATENT DOCUMENTS

JP A 2007-178941 7/2007
JP A 2007-537465 12/2007

(Continued)

Primary Examiner — Joe H Cheng
(74) Attorney, Agent, or Firm — Oliff PLC

(57) ABSTRACT

A light emitting device, which is a main body, is arranged to be located closer to the nose NS side than the eye EY of a wearer during wearing of a virtual image display device. Therefore, the light emitting device is prevented from excessively projecting to the side of the face of the wearer. The light emitting device is arranged between the eye EY of the wearer and the virtual-image forming member. Therefore, the light emitting device is prevented from excessively projecting further to the front side than the virtual image forming member, i.e., the front side of the face of the wearer. Further, a combined-light forming unit is a unit small in size and light in weight. Therefore, it is possible to suppress the center of gravity of the entire virtual image forming member from deviating to the side and the front side.

9 Claims, 10 Drawing Sheets

(56) References Cited

U.S. PATENT DOCUMENTS

2013/0235440 A1* 9/2013 Takeda et al. .............. 359/197.1
2014/0049831 A1* 2/2014 Takeda et al. ................ 359/630

FOREIGN PATENT DOCUMENTS

| WO | WO 2005/114631 A2 | 12/2005 |
| WO | WO 2009/041055 A1 | 4/2009 |

* cited by examiner

VIRTUAL IMAGE DISPLAY DEVICE

BACKGROUND

1. Technical Field

The present invention relates to a virtual image display device such as a head mounted display that is used while being mounted on the head.

2. Related Art

In recent years, as a virtual image display device for enabling formation and observation of a virtual image such as a head mounted display, various head mounted displays that scan an image light and project an image on the retinas of the eyes are proposed (see JP-A-2007-178941 (Patent Literature 1), WO2009/041055 (Patent Literature 2), and JP-T-2007-537465 (Patent Literature 3)). In particular, a head mounted display configured "see-through" in order to superimpose image light and external light one on top of the other is proposed (see, for example, Patent Literature 1). In the head mounted displays disclosed in Patent Literature 1 and the Patent Literature 2, a device that forms a virtual image is arranged closer to the ear side than the eye of a wearer, who should be an observer. In the head mounted display disclosed in Patent Literature 3, a device that forms a virtual image is arranged on the front side of the eye of a wearer.

However, when the device that forms a virtual image is arranged closer to the ear side than the eye of the wearer as disclosed in Patent Literature 1 and Patent Literature 2 or when the device that forms a virtual image is arranged on the front side of the eye of the wearer as disclosed in Patent Literature 3, the device projects to the side or the front side from the face of the wearer. As a result, the center of gravity of the head mounted display is away from the wearer, the feeling of the weight of the head mounted display increases, and the external design of the head mounted display is limited.

SUMMARY

An advantage of some aspects of the invention is to provide a virtual image display device that can suppress an increase in the feeling of the weight of the virtual image display device to reduce a load of wearing and increase a degree of freedom of design of the virtual image display device.

An aspect of the invention is directed a virtual image display device including: a signal-light modulating unit configured to emit a signal light modulated according to an image; a scanning optical system configured to scan the signal light made incident from the signal-light modulating unit and emit the signal light as scanning light; and a virtual-image forming member configured to receive irradiation of the scanning light from the scanning optical system and form a virtual image. The scanning optical system is located closer to the nose side than the eye of a wearer during wearing of the virtual image display device. The virtual-image forming member is arranged to be located in front of the eye of the wearer and further on the far side than the scanning optical system with respect to the wearer during wearing of the virtual image display device.

In the virtual image display device, the scanning optical system is arranged to be located closer to the nose side than the eye of the wearer. Therefore, a device that forms a virtual image is prevented from projecting to the side of the face of the wearer. The virtual-image forming member is arranged to be located in front of the eye present further on the far side than the scanning optical system for the wearer. The scanning optical system irradiates the scanning light from the wearer side toward the virtual-image forming member. Therefore, the device that forms a virtual image is prevented from projecting to the front side of the wearer as well. Therefore, it is possible to suppress excessive projection of an optical component to the side and the front side in a state in which the virtual image display device is worn in front of the eye, suppress an increase in the feeling of weight due to the deviation of the center of gravity of the virtual image display device, and increase a degree of freedom of design of the virtual image display device.

In a specific aspect of the invention, the virtual-image forming member is arranged in a state in which the virtual-image forming member inclines in a direction from the nose side to the ear side of the wearer during wearing of the virtual image display device. Therefore, since the virtual-image forming member is arranged along the face of the wearer, it is possible to realize a reduction in size and improve design properties of the virtual image display device.

In another aspect of the invention, the virtual-image forming member includes a semitransparent reflection film that reflects the scanning light irradiated from the scanning optical system to form a virtual image, allows the external light to pass, and enables observation of the virtual image formed by the scanning light and observation of the external light. Since the semitransparent reflection film is used, it is possible to realize a see-through configuration with which not only the virtual image but also an external image can be recognized.

In still another aspect of the invention, the virtual-image forming member is a transparent base material in which a diffraction grating for forming the virtual image with the scanning light irradiated from the scanning optical system is arranged, the transparent base material allowing the external light to pass. Since the diffraction grating is used, the function can be achieved by a film-like member it is possible to form image light while securing a degree of freedom of design of the virtual image display device. Further, the virtual-image forming member is, for example, the transparent base material in which the diffraction grating is supported on a transparent substrate. Therefore, it is possible to realize a see-through configuration with which not only the virtual image but also an external image can be recognized.

In yet another aspect of the invention, the virtual image display device further includes a nose pad section for wearing the virtual image display device in the nose of the wearer during wearing of the virtual image display device. The scanning optical system is integrated with the nose pad section. Since the components are used in common, it is possible to realize a reduction in the size and a reduction in the weight of the virtual image forming device.

In still yet another aspect of the invention, the virtual image display device further includes an eye-width adjusting section configured to enable, according to the eye width of the wearer, the scanning optical system and the virtual-image forming member to integrally move with respect to the position of the eye of the wearer during wearing of the virtual image display device. Therefore, it is possible to align the eye width according to an individual difference of the eye width while keeping constant a relative positional relation between the virtual-image forming member and the eye-width adjusting section.

In further another aspect of the invention, the signal-light modulating unit includes a combined-light forming unit configured to form, as signal light, combined light obtained by combining R light, G light, and B light and an optical fiber configured to propagate the signal light formed by the combined-light forming unit to the scanning optical system. Therefore, it is possible to disperse the weight of the entire virtual image display device, reduce the feeling of weight during wearing of the virtual image display device by adjusting the center of gravity during the wearing, and enable more comfortable viewing. Further, it is possible to increase a degree of freedom of design of the entire virtual image display device by adjusting the optical fiber as appropriate.

In still further another aspect of the invention, in the signal-light modulating unit, the combined-light forming unit is arranged in a position corresponding to the ear side. The optical fiber extends along a path from the periphery of the ear to the periphery of the nose through the periphery of the eye along a face shape of the wearer during wearing of the virtual image display device to propagate the modulated signal light from the combined-light forming unit to the scanning optical system. Therefore, it is possible to increase a degree of freedom of design of the entire virtual image display device while suppressing the combined-light forming unit and the like from projecting to the side and the front side.

In yet further another aspect of the invention, the scanning optical system includes a MEMS scanner configured to irradiate the signal light, a state of a light beam of which is adjusted, to the virtual-image forming member as the scanning light. Therefore, it is possible to surely scan light in an indispensable region to be irradiated on the virtual-image forming member.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A virtual image display device according to a first embodiment of the invention is explained in detail below with reference to the drawings.

Figure 1:
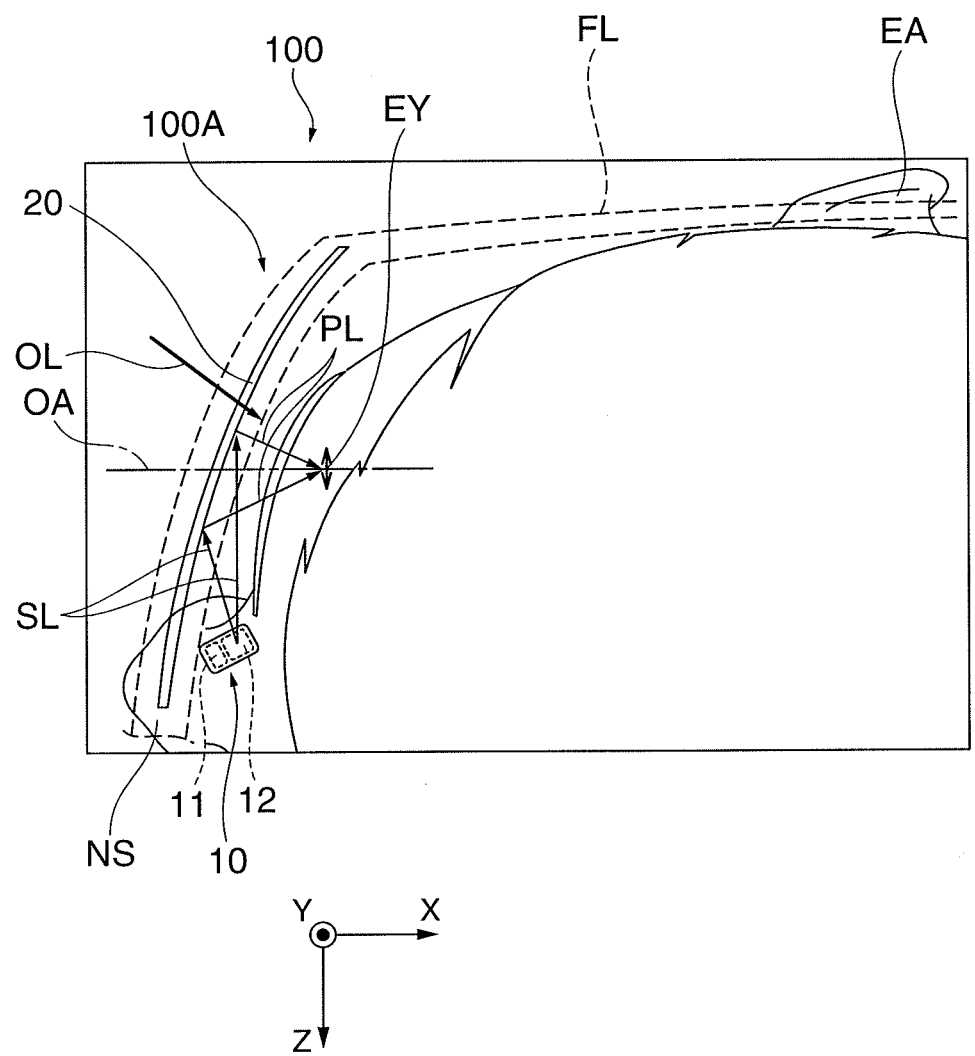
FIG. 1 is a diagram showing a virtual image display device according to a first embodiment.

A virtual image display device 100 according to this embodiment shown in FIG. 1 is a head mounted display having an external appearance like glasses. The virtual image display device 100 can allow a wearer, who should be an observer, wearing the virtual image display device 100 to recognize image light formed by a virtual image and allow the wearer to observe an external image in a see-through manner. In FIG. 1, a state in which the wearer wears the virtual image display device 100 is shown while being partially enlarged. A part of the virtual image display device 100 is omitted. Specifically, a first display device 100A is a section that forms a virtual image for the right eye in the virtual image display device 100. The virtual image display device 100 includes the first display device 100A for the right eye and a second display device for the left eye as a pair of display devices. The second display device includes structure same as the structure of the first display device 100A. In the second display device, the left and right of the first display device 100A are merely reversed. Therefore, the second display device is not shown in the figure. The first display device 100A alone also functions as a virtual image display device.

In the figure, a direction right in front of the wearer is the direction of an optical axis OA. A direction in which the optical axis OA extends from the virtual image display device 100 side to the wearer side is represented as +X direction, an up down direction for the wearer is represented as ±Y direction, and a left right direction for the wearer is represented as ±Z direction.

Figure 2A:
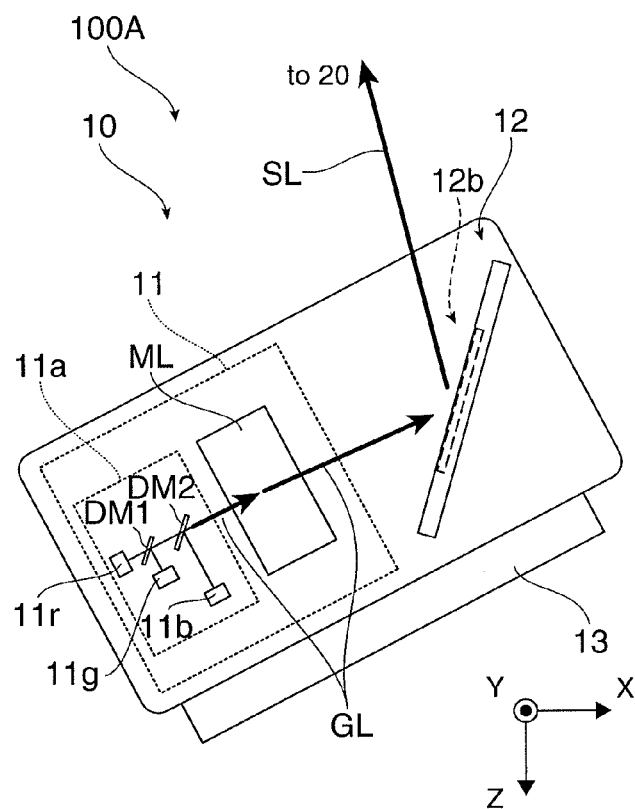
FIG. 2A is a diagram for explaining an example of the structure of a light emitting device.
Figure 2B:
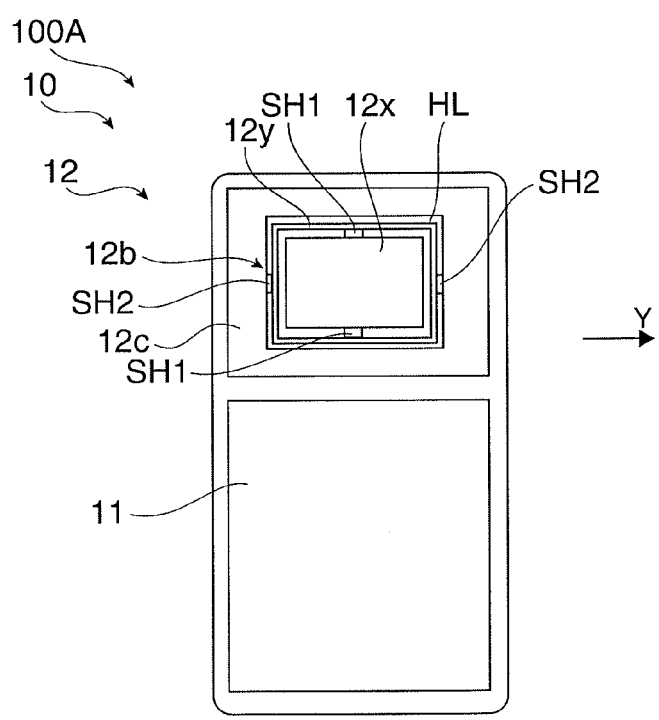
FIG. 2B is a diagram of the light emitting device shown in FIG. 2A viewed from another direction.

An example of the structure of the first display device 100A is explained to explain an example of the structure of the virtual image display device 100. The first display device 100A includes a light emitting device 10 that forms signal light and emits the signal light as scanning lights SL and a virtual-image forming member 20 functioning as a member to be irradiated that receives the scanning lights SL from the light emitting device 10 and forms image lights PL. As shown in FIG. 1, the light emitting device 10 is arranged around a nose NS of the wearer. The virtual-image forming member 20 is arranged to cover the front of an eye EY of the wearer in the front side (a −X side) of the light emitting device 10. The light emitting device 10 includes, as shown in FIGS. 2A and 2B, a signal-light modulating unit 11 functioning as a signal light forming unit, a scanning optical system 12, and a driving control circuit 13. As shown in FIG. 1, various signals concerning an image and sound sent to the virtual image display device 100 are transmitted to the driving control circuit 13 through a cable (not shown in the figure) housed in a frame FL of the virtual image display device 100.

As shown in FIG. 2A, the signal-light modulating unit 11 includes a combined-light forming unit 11a and a relay lens ML. The combined-light forming unit 11a forms combined light, which is signal light GL that should be the image lights PL (see FIG. 1). Therefore, the combined-light forming unit 11a includes color light sources 11r, 11g, and 11b that generate color lights of red (R light), green (G light), and blue (B light) and first and second dichroic mirrors DM1 and DM2 for combining the color lights generated by the color light sources 11r, 11g, and 11b. The relay lens ML is a lens that adjusts a light beam state of the signal light GL, which is the combined light emitted from the combined-light forming unit 11a, to module the signal light GL and emit the signal light GL to the scanning optical system 12. For example, the relay lens ML substantially parallelizes the signal light GL. The scanning optical system 12 includes a MEMS mirror unit 12b functioning as a scan unit that two-dimensionally scans, in the virtual-image forming member 20, the signal light GL emitted by the relay lens ML.

In the signal-light modulating unit 11, the color light sources 11r, 11g, and 11b are diode laser light sources or LED light sources. The red light source 11r emits light in a specific wavelength band for generating red light. The green light source 11g emits light in a specific wavelength band for generating green light, and the blue light source 11b emits light in a specific wavelength band for generating blue light. The color light sources 11r, 11g, and 11b include, for example, LED light-emitting elements of the respective colors. The color light sources 11r, 11g, and 11b emit the color lights with the direction of light beams adjusted such that the color lights travel in the direction of the first dichroic mirror DM1 or the second dichroic mirror DM2.

The first dichroic mirror DM1 transmits light in the specific wavelength band for generating the red light and reflects lights in the other specific wavelength bands. The second dichroic mirror DM2 transmits lights in the specific wavelength bands for generating the red light and the green light and reflects light in the other specific wavelength band. Consequently, combined light obtained by combining the color lights of the three colors, i.e., the red light, the green light, and the blue light is formed as the signal light GL for forming a color image. In the figure, the positions of the color light sources 11r, 11g, and 11b are respectively adjusted to equalize optical path lengths of the color lights of the three colors to be combined. In other words, the color lights are in equivalent positions. The size of the second dichroic mirror DM2 with respect to the first dichroic mirror DM1 is also adjusted according to the shape of a light beam.

When combined light formation is performed in the combined-light forming unit 11a having the configuration explained above, the color light sources 11r, 11g, and 11b corresponding to the respective colors of red (R light), green (G light), and blue (B light) are used. Therefore, efficiency of use of the lights is high.

The relay lens ML adjusts a divergence angle of the signal light GL, which is the combined light formed by the combined-light forming unit 11a, and emits the signal light GL to the MEMS mirror unit 12b functioning as the scan unit of the scanning optical system 12. According to the adjustment of a divergence state in the relay lens ML, for example, it is possible to made the signal light GL incident on the MEMS mirror unit 12b in a state in which the signal light GL is substantially parallelized.

As shown in FIG. 2B, the scanning optical system 12 includes the MEMS mirror unit 12b and a peripheral member 12c. The MEMS mirror unit 12b uses the signal light GL emitted from the relay lens ML as the scanning lights SL to make it possible to form an image on a region to be irradiated of the virtual-image forming member 20 (see FIG. 1) functioning as the member to be irradiated. In other words, the MEMS mirror unit 12b is a core section of the scanning optical system 12. The peripheral member 12c forms a hole HL that surrounds the MEMS mirror unit 12b to house the MEMS mirror unit 12b. In other words, the MEMS mirror unit 12b is housed in the hole HL having a rectangular shape provided in the center of the scanning optical system 12. The MEMS mirror unit 12b can incline in an arbitrary direction.

The MEMS mirror unit 12b is explained in detail. The MEMS mirror unit 12b is a scan unit that two-dimensionally scans the signal light GL, which is the combined light formed by the signal-light modulating unit 11, in the virtual-image forming member 20 (see FIG. 1) and emits the signal light GL as the scanning lights SL for irradiating the virtual-image forming member 20 (see FIG. 1). The MEMS mirror unit 12b includes a MEMS mirror body unit 12x rotatable with respect to one axis direction to enable the two-dimensional scanning and a mirror frame body 12y that is a frame surrounding the MEMS mirror body unit 12x and rotatable with respect to an axis direction perpendicular to the one axis direction. First, the MEMS mirror body unit 12x includes a pair of first shafts SH1 connected to the mirror frame body 12y. The MEMS mirror body unit 12x is rotatable around the first shafts SH1. The mirror frame body 12y includes a pair of second shafts SH2 connected to the peripheral member 12c of the MEMS mirror unit 12b. The mirror frame body 12y is rotatable around the second shafts SH2. Since the axis direction of the first axes SH1 and the axis direction of the second axes SH2 are perpendicular to each other, the MEMS mirror unit 12b enables the MEMS mirror body unit 12x to rotate in the two axis directions perpendicular to each other. Consequently, the MEMS mirror unit 12b can incline in an arbitrary direction and enables the two-dimensional scanning of the scanning lights SL, which are beams to be emitted. In other words, the MEMS mirror unit 12b is a MEMS scanner that irradiates the scanning lights SL to the virtual-image forming member 20.

On the light emission side of the MEMS mirror unit 12b, it is possible to arrange a relay lens for adjusting a divergence angle of a light beam.

The driving control circuit 13 performs driving control for the light emitting device 10 according to an image signal and a driving signal transmitted through the cable (not shown in the figure) housed in the frame FL. In other words, the driving control circuit 13 is a control circuit for driving the signal-light modulating unit 11 and the scanning optical system 12 in synchronization with each other according to various signals.

Referring back to FIG. 1, the virtual-image forming member 20 is a transparent base material including a semitransparent reflection film on a transparent substrate made of resin. In other words, the virtual-image forming member 20 is a half mirror. The virtual-image forming member 20 is assembled to the frame FL and arranged to be located in front of the eye EY of the wearer and further on the far side than the light emitting device 10 with respect to the wearer. In other words, the light emitting device 10 is arranged between the eye EY of the wearer and the virtual-image forming member 20 with respect to the direction along the optical axis OA. The virtual-image forming member 20 has a size sufficient for covering the eye EY of the wearer from the front. The virtual-image forming member 20 receives the scanning lights SL, which are irradiated from the scanning optical system 12 of the light emitting device 10 while being tilted in the −X direction, reflects the scanning lights SL to form a virtual image, and causes the wearer to recognize the virtual image. The virtual-image forming member 20 is formed to correspond to the external appearance of the virtual image display device 100. In the example shown in FIG. 1, the virtual-image forming member 20 has a shape bent along the frame FL.

The virtual-image forming member 20 functioning as the half mirror is a tabular member having substantially uniform thickness. The virtual-image forming member 20 not only forms a virtual image as explained above but also allows external light OL to pass. In other words, not only the virtual image but also light from the external environment enters the eye EY of the wearer. The virtual image display device 100 has a see-through configuration.

The light emitting device 10 of the virtual image display device 100 is arranged to be located closer to the nose NS side than the eye EY of the wearer during wearing of the virtual image display device 100 with respect to the lateral direction perpendicular to the optical axis OA. In this case, the light emitting device 10 is configured not to project to the side of the wearer, i.e., in the Z direction. As explained above, the light emitting device 10 is arranged between the eye EY of the wearer and the virtual-image forming member 20. In this case, the light emitting device 10 is not arranged further on the front side than the virtual-image forming member 20.

Figure 3:
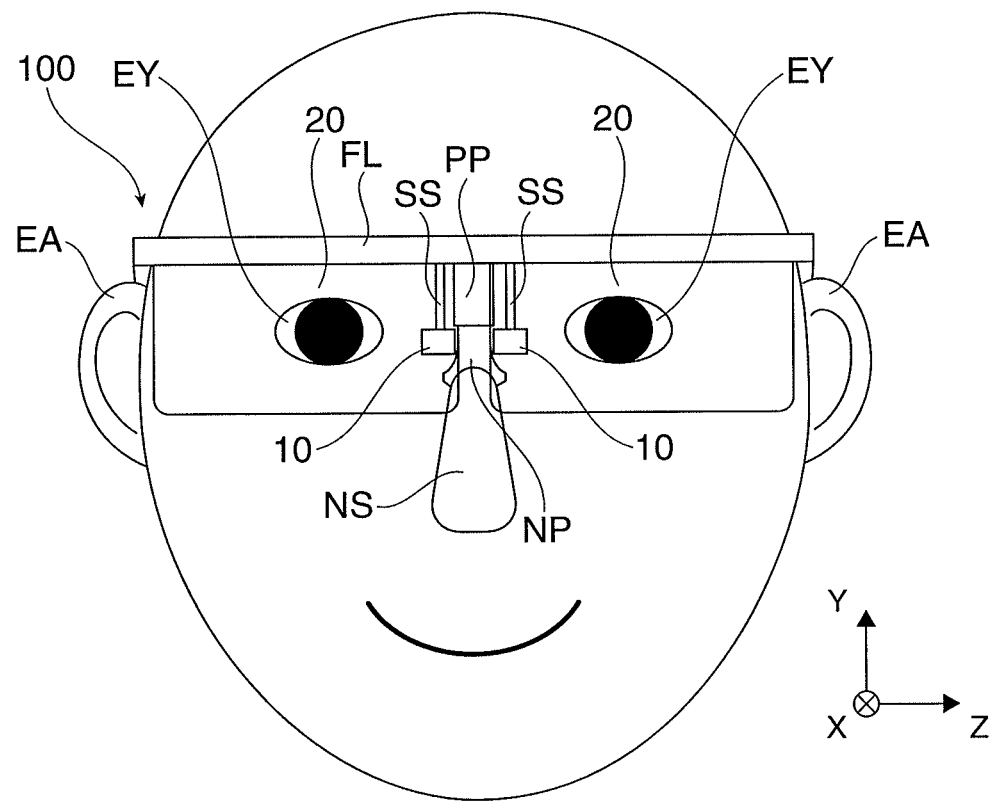
FIG. 3 is a front view schematically showing a state in which the virtual image display device is worn.

FIG. 3 is a front view schematically showing a state in which the virtual image display device 100 explained above is worn. In an example shown in the figure, the light-emitting device 10 is supported by a supporting body SS, which extends from the frame FL, to be arranged, as described above, around the nose NS and in a position further on the +X side than the virtual-image forming member 20. In the example shown in the figure, the virtual image display device 100 includes a column section PP that extends from the center of the frame FL and supports the virtual-image forming member 20 from a side and includes, on the distal end side of the column section PP, a nose pad section NP for enabling the virtual image display device 100 to be supported by the nose NS during wearing of the virtual image display device 100.

The operation of the light emitting device 10 is explained below with reference to FIG. 2A and the like. First, the signal-light modulating unit 11 of the light emitting device 10 forms the signal light GL, which is the combined light obtained by combining the color lights of red (R light), green (G light), and blue (B light), and emits the signal light GL. The emitted signal light GL is made incident on the relay lens ML of the scanning optical system 12. A divergent state of a light beam is adjusted. The signal light GL emitted from the relay lens ML is made incident on the MEMS mirror unit 12b functioning as the scan unit. The MEMS mirror unit 12b emits the signal light GL as the scanning lights SL for scanning the region to be irradiated of the virtual-image forming member 20. In the virtual-image forming member 20, the scanning lights SL are scanned and made incident by the MEMS mirror unit 12b. Consequently, a virtual image is formed by the image lights PL shown in FIG. 1. The wearer captures the virtual image with the eyes EY to recognize an image.

In the operation for irradiating the scanning lights SL on the virtual-image forming member 20 using the scanning optical system 12, the driving control circuit 13 controls the MEMS mirror unit 12b taking into account a positional relation between the light emitting device 10 and the virtual-image forming member 20 and the shape of the region to be irradiated of the virtual-image forming member 20. As explained above, the virtual-image forming member 20 has the shape bent along the frame FL. The scanning is performed according to the shape to prevent distortion and the like from occurring in the formation of a virtual image.

Concerning the image lights PL reflected by the virtual-image forming member 20, an incident angle on the eyes EY of the wearer is different depending on a reflection position. Respective light beams are parallelized. Therefore, the wearer can capture an entire image from the entire image lights PL by grasping positions of the image according to the difference in the incident angle. The difference is provided in the incident angle among the image lights PL made incident on the eyes EY and a light beam state of the image lights PL is parallelized in this way. This is realized by enabling the MEMS mirror unit 12b functioning as the scan unit to incline at an arbitrary angle and by providing an optical system on the light emission side of the MEMS mirror unit 12b to perform correction according to necessity.

As explained above, in the virtual image display device 100 according to this embodiment, the light emitting device 10 functioning as a main body section that substantially forms an image is arranged to be located closer to the nose NS side than the eye EY of the wearer during wearing of the virtual image display device 100. Therefore, the entire virtual image display device 100 is prevented from excessively projecting to the side of the face of the wearer. The light emitting device 10 is arranged between the eye EY of the wearer and the virtual-image forming member 20. Therefore, the light emitting device 10 including the scanning optical system 12 is prevented from excessively projecting further to the front side, i.e., the front side of the face of the wearer than the virtual-image forming member 20. Consequently, the virtual image display device 100 according to this embodiment can suppress the projection to the side and the front side and increase a degree of freedom of design of the virtual image display device 100. Further, since the combined-light forming section 11a has the relatively simple structure as explained above, it is possible to reduce the size and the weight of the combined-light forming unit 11a. Therefore, it is possible to suppress the center of gravity of the entire virtual image display device 100 from deviating to the side and the front side and reduce the feeling of weight on the wearer when the wearer uses the virtual image display device 100.

In the structure of the signal-light modulating unit 11 shown in FIG. 2A and the like explained above, the lights from the color light sources 11r, 11g, and 11b are combined in the formation of the signal light GL in the combined-light forming unit 11a. However, this is an example in the signal light formation in this embodiment. The signal light GL can also be formed by other configurations.

Modifications of the signal-light modulating unit 11 are explained with reference to FIG. 4A and the like schematically showing the structure of the signal-light modulating unit 11. First, as indicated by an example shown in FIG. 4A, in the signal-light modulating unit 11, the combined-light forming unit 11a may include the three color light sources 11r, 11g, and 11b as one unit. In this case, a color image can be formed by one combined-light forming unit 11a.

Figure 4A:
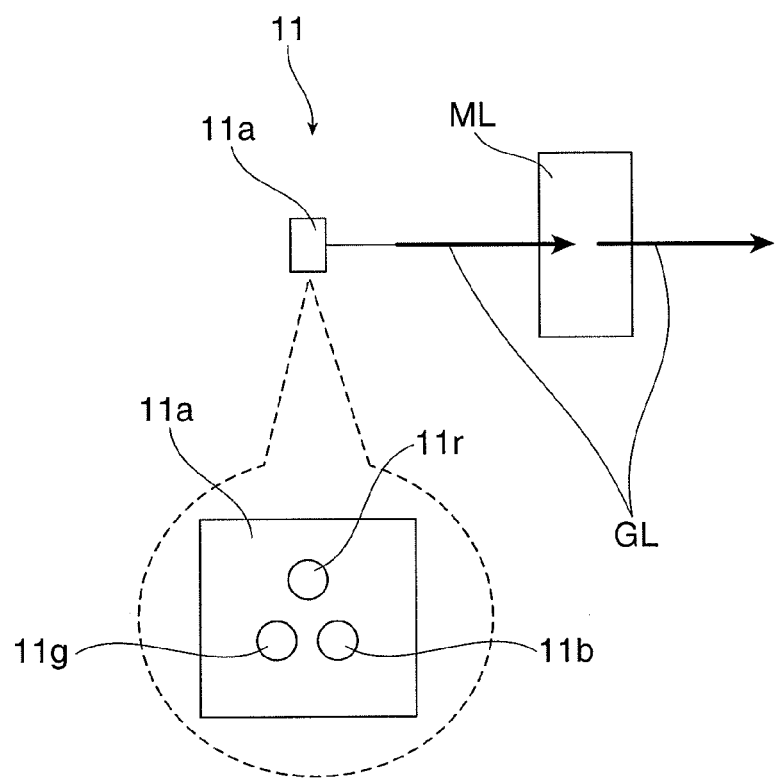
FIG. 4A is a diagram for explaining another example of the structure of the light emitting device.
Figure 4B:
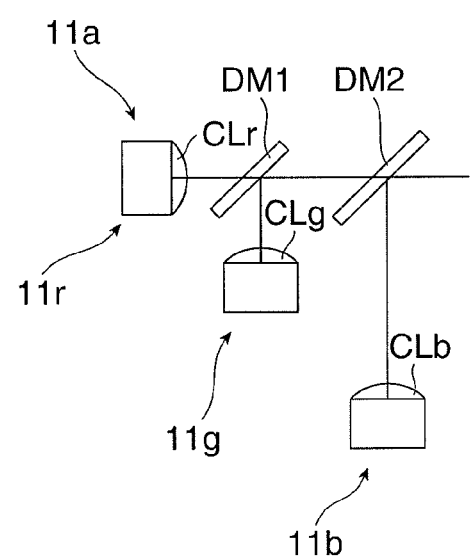
FIG. 4B is a diagram for explaining still another example of the structure of the light emitting device.

As indicated by an example shown in FIG. 4B, the color light sources 11r, 11g, and 11b may include, on the light emission side, condensing lenses CLr, CLg, and CLb that respectively condense the color lights. In the example shown in FIG. 4A, the combined-light forming unit 11a may include the same condensing lens on the light emission side.

The condensing lenses CLr, CLg, and CLb function as lenses that change lights, which should be emitted from the color light sources 11r, 11g, and 11b, to a condensed state and adjust the direction of light beams to travel accurately in the direction of the first dichroic mirror DM1 or the second dichroic mirror DM2.

The signal-light modulating unit 11 may have a configuration other than the configurations shown in FIGS. 4A and 4B. For example, it is also conceivable that signal light is formed by a white light source and a color wheel.

Second Embodiment

A virtual image display device according to a second embodiment is explained below. The virtual image display device according to this embodiment is a modification of the virtual image display device 100 according to the first embodiment. Unless specifically explained, it is assumed that the virtual image display device is the same as the virtual image display device 100 according to the first embodiment.

Figure 5:
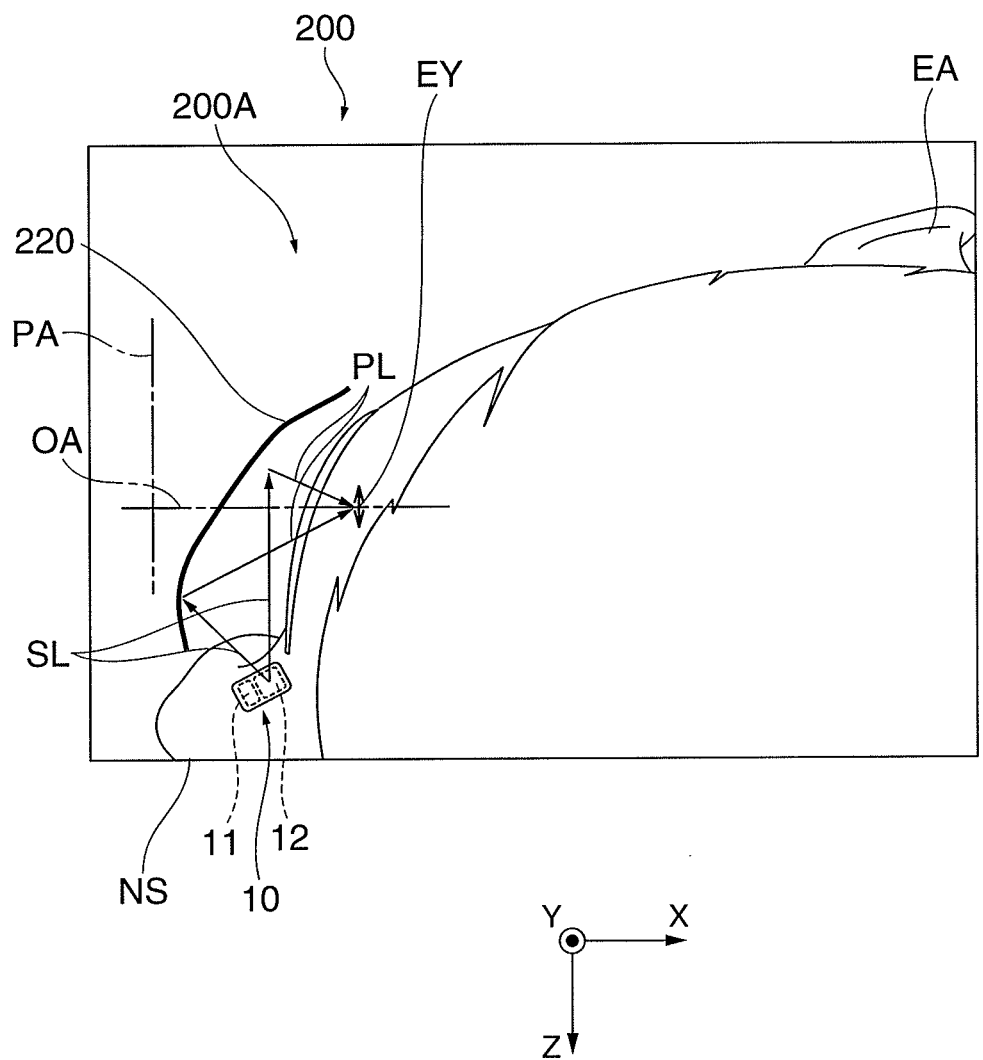
FIG. 5 is a diagram showing a virtual image display device according to a second embodiment.

As shown in FIG. 5, a virtual-image forming member 220 of a first display device 200A included in a virtual image display device 200 according to this embodiment is arranged in an inclining state during wearing of the virtual image display device 200. More specifically, when a surface perpendicular to the optical axis OA, i.e., a surface parallel to the YZ plane is set as reference plane PA, the virtual-image forming member 220 inclines in a direction from the nose NS side to an ear EA side of the wearer with respect to the reference plane PA. It is determined according to an average tilt of the surface of the virtual-image forming member 220, which is a curved surface, with respect to the reference plane PA whether the virtual-image forming member 220 inclines. In other words, if the average tilt is in the direction from the nose NS side to the ear EA side of the wearer with respect to the reference plane PA, even if, for example, a portion of the surface of the virtual-image forming member 220 is parallel to the reference plane PA, it is considered that the virtual-image forming member 220 inclines. In this case, the surface of the virtual-image forming member 220 inclines with respect to the reference plane PA to have a shape along the face of the wearer. Consequently, it is possible to realize a reduction in the size of the virtual image display device 200 and increase design properties of the virtual image display device 200. Further, when a wearer who wears glasses is assumed, it is possible to configure the virtual-image forming member 220 and the glasses with the same member by setting the inclination of the virtual-image forming member 200 same as the inclination of the glasses.

Third Embodiment

A virtual image display device according to a third embodiment is explained below. The virtual image display device according to this embodiment is a modification of the virtual image display device 100 according to the first embodiment. Unless specifically explained, the virtual image display device is the same as the virtual image display device 100 according to the first embodiment.

Figure 6:
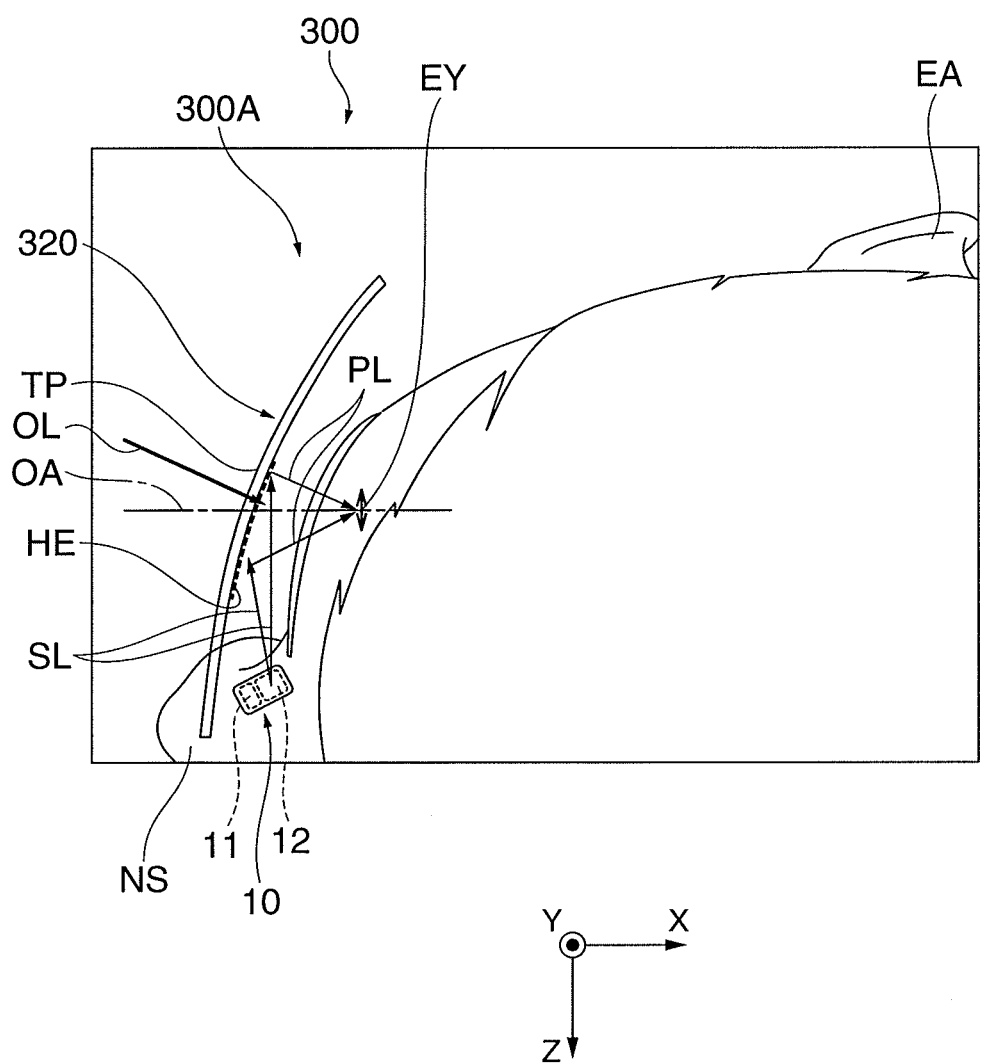
FIG. 6 is a diagram showing a virtual image display device according to a third embodiment.

As shown in FIG. 6, a virtual-image forming member 320, which is a transparent base material, of a first display device 300A included in a virtual image display device 300 according to this embodiment has a configuration in which hologram elements HE are provided on a transparent substrate TP as an example of a diffraction grating. Specifically, the virtual-image forming member 320 forms a virtual image with the image lights PL in a specific wavelength band making use of diffraction in the hologram elements HE, which are a film-like member supported by the transparent substrate TP, and allows the external light OL in a wide-range wavelength band to pass through the transparent substrate TP and the hologram elements HE. Consequently, it is possible to realize a see-through configuration. In this case, an emitting direction of light can be adjusted on the side of the hologram elements HE, which are the film-like member. Therefore, it is possible to further increase a degree of freedom of the shape of the virtual-image forming member 320 and improve design properties of the virtual image display device 300. It is possible to adjust an incident angle and a light beam state of the image lights PL to a desired incident angle and a desired light beam state by imparting a lens effect to the hologram elements HE.

Fourth Embodiment

A virtual image display device according to a fourth embodiment is explained below. The virtual image display device according to this embodiment is a modification of the virtual image display device 100 according to the first embodiment. Unless specifically explained, the virtual image display device is the same as the virtual image display device 100 according to the first embodiment.

Figure 7:
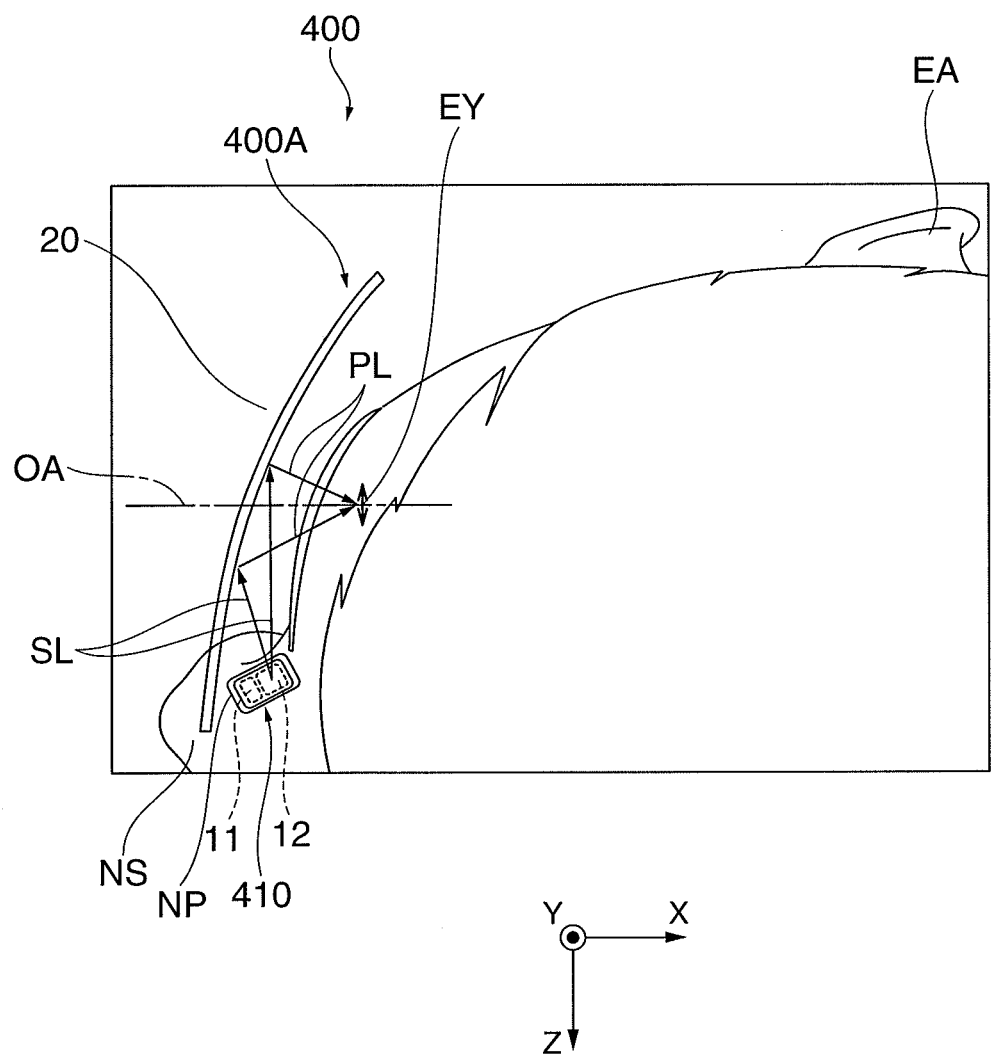
FIG. 7 is a diagram showing a virtual image display device according to a fourth embodiment.

As shown in FIG. 7, a first display device 400A included in a virtual image display device 400 according to this embodiment includes, for wearing of the virtual image display device 400, the nose pad section NP that supports the virtual image display device 400 in the nose NS of the wearer. A light emitting device 410 including the scanning optical system 12 is integrated with the nose pad section NP. In this case, since the components are used in common, it is possible to realize a reduction in the size and a reduction in the weight of the virtual image display device 400 and perform position adjustments for the eye width together with position adjustment for the nose pad section NP.

Fifth Embodiment

A virtual image display device according to a fifth embodiment is explained below. The virtual image display device according to this embodiment is a modification of the virtual image display device 100 according to the first embodiment. Unless specifically explained, the virtual image display device is the same as the virtual image display device 100 according to the first embodiment.

Figure 8:
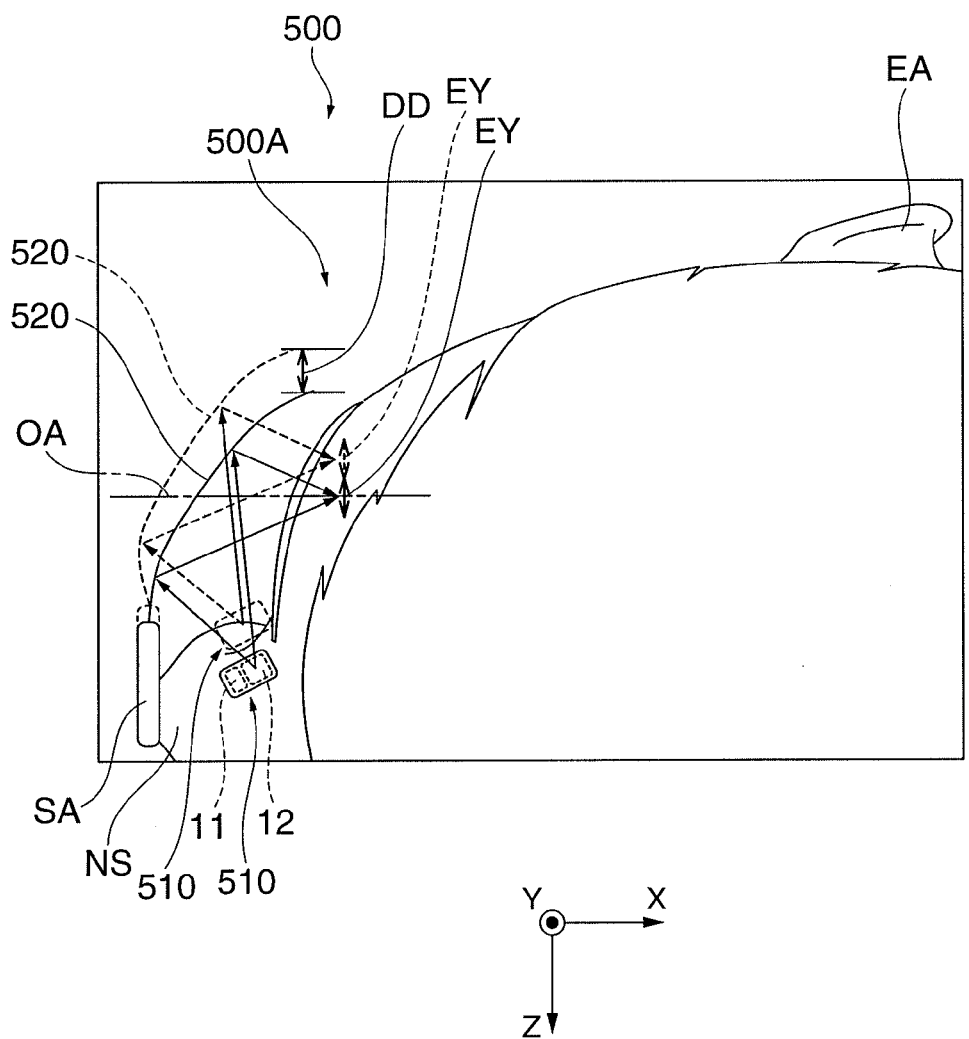
FIG. 8 is a diagram showing a virtual image display device according to a fifth embodiment.

As shown in FIG. 8, a first display device 500A included in a virtual image display device 500 according to this embodiment includes an eye-width adjusting section SA that adjusts the positions of a light emitting device 510 and a virtual-image forming member 520 according to the eye width of a wearer (a distance between both the eyes of the wearer). There is a difference in the eye width of a human depending on a race, a sex, or an individual. In this embodiment, eye width adjustment is performed by enabling a distance from the nose NS to the eye EY, which is equivalent to the eye width, to be adjusted by the eye-width adjusting section SA.

The eye-width adjusting section SA can integrally move, with a not-shown slide mechanism, the positions of the light emitting device 510 including the scanning optical system 12 and the virtual image forming member 520 in the Z direction, which is the lateral direction for the wearer. As shown in the figure, the positions can be adjusted in a range of adjustment width DD in the Z direction. Sufficient position adjustment can be performed by setting the adjustment width DD in a range including a general difference in the eye width of a human. In the adjustment by the eye-width adjusting section SA, the light emitting device 510 and the virtual-image forming member 520 integrally move. Consequently, a projection state from the light emitting device 510 side to the virtual-image forming member 520 is kept constant without changing.

Sixth Embodiment

A virtual image display device according to a sixth embodiment is explained below. The virtual image display device according to this embodiment is a modification of the virtual image display device 100 according to the first embodiment. Unless specifically explained, the virtual image display device is the same as the virtual image display device 100 according to the first embodiment.

Figure 9:
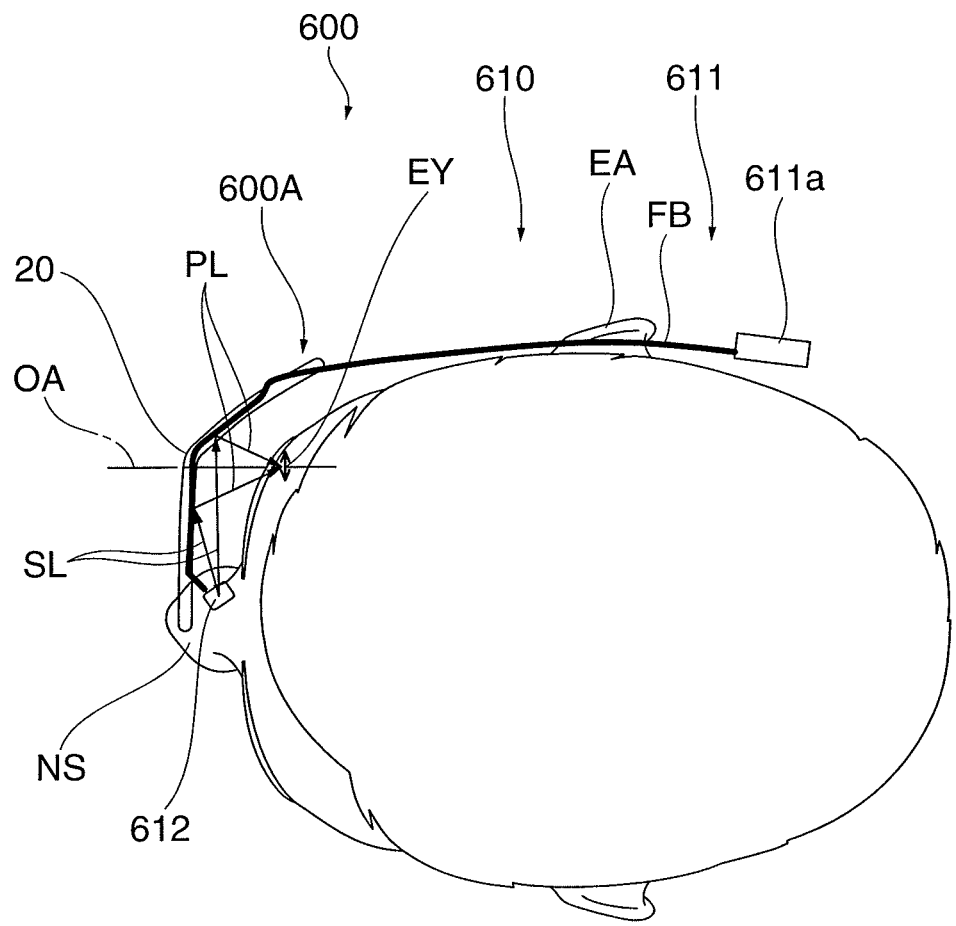
FIG. 9 is a diagram showing a virtual image display device according to a sixth embodiment.
Figure 9:
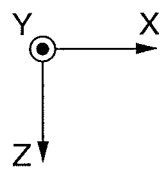

As shown in FIG. 9, a virtual image display device 600 according to this embodiment includes a light emitting device 610 and the virtual-image forming member 20. The light emitting device 610 includes a signal-light modulating unit 611 including a light source unit and a scanning optical system 612 including a scan unit. The signal-light modulating unit 611 includes a combined-light forming unit 611a that forms combined light, which should be image light, an optical fiber FB, and the relay lens ML. In the light emitting device 610, the combined-light forming unit 611a and the scanning optical system 612 are separated. The optical fiber FB connects the combined-light forming unit 611a and the scanning optical system 612. In other words, the members included in the light emitting device 610 can be dispersedly arranged. As an example, the optical fiber FB extends from the ear EA side to the nose NS side through the periphery of the eye EY along the face shape of a wearer to connect the combined-light forming section 611a present on the ear EA side and the scanning optical system 612 preset in the periphery of the nose NS.

Figure 10:
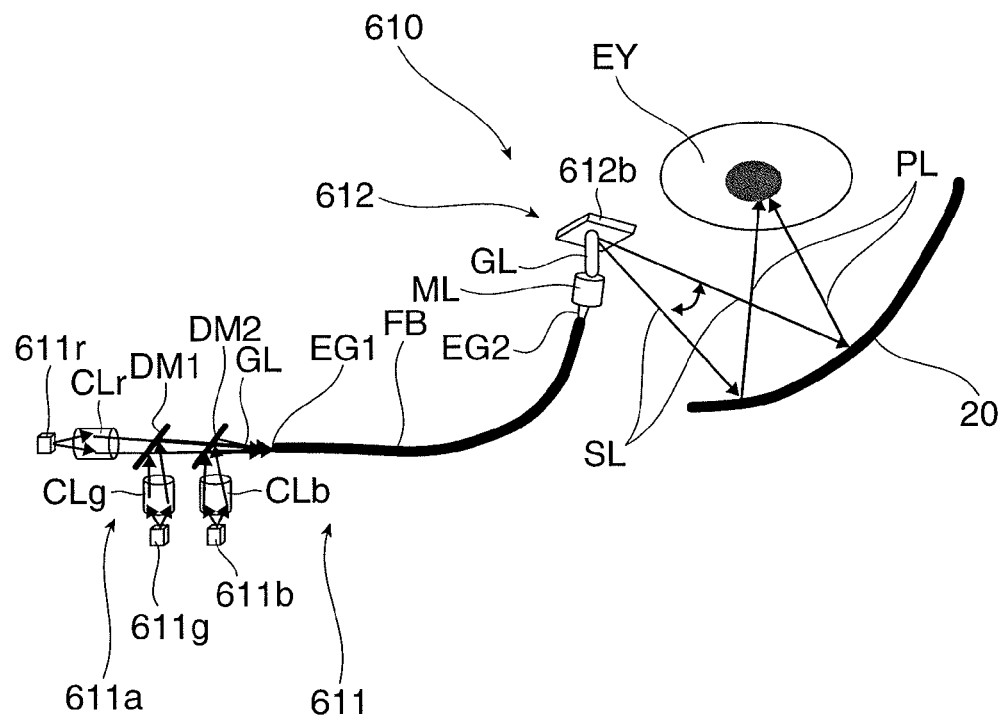
FIG. 10 is a schematic diagram for explaining an example of the structure of the light emitting device.

An overview of the units of the light emitting device 610 is explained with reference to FIG. 10 schematically showing the structure of the light emitting device 610. First, in the light emitting device 610, the signal-light modulating unit 611 includes, as the combined-light forming unit 611a, color light sources 611r, 611g, and 611b for three colors, which are light source units for red, green, and blue, the condensing lenses CLr, CLg, and CLb that respectively condense color lights emitted from the color light sources 611r, 611g, and 611b, and the first and second dichroic mirrors DM1 and DM2 for combining the color lights emitted by the condensing lenses CLr, CLg, and CLb. The signal-light modulating unit 611 includes the optical fiber FB that propagates combined light, which is the signal light GL formed by the combined-light forming unit 611a, to the scanning optical system 612. Further, the signal-light modulating unit 611 includes the relay lens ML for adjusting a divergence state of the light propagated by the optical fiber FB.

The optical fiber FB includes a first fiber end EG1 connected to the signal-light modulating section 611 and a second fiber end EG2 connected to the scanning optical system 612. The signal light GL, which is the combined light emitted from the combined-light forming unit 611a, is captured into the optical fiber FB from the first fiber end EG1, which is one end, propagated through the inside of the optical fiber FB, and emitted from the second fiber end EG2, which is the other end, to the relay lens ML arranged on the scanning optical system 612 side.

The relay lens ML emits the signal light GL, which is propagated through the optical fiber FB, to the scanning optical system 612 with a divergence state of light beams adjusted (e.g., the light beams changed to parallel beams).

The scanning optical system 612 includes a MEMS mirror unit 612b that emits the signal light GL, which is emitted from the relay lens ML, as the scanning lights SL and two-dimensionally scans the scanning lights SL in the virtual-image forming member 20.

The operation of the light emitting device 610 is explained below. First, diode lasers or LED lights emitted from the color light sources 611r, 611g, and 611b are respectively condensed by the condensing lenses CLr, CLg, and CLb correspondingto the color light sources 611r, 611g, and 611b and combined by the dichroic mirrors DM1 and DM2 to form combined light, which is the signal light GL. The signal light GL, which is the combined light, is condensed at and coupled to the first fiber end EG1 of the optical fiber FB. Further, the signal light GL is propagated through the optical fiber FB and, after being emitted from the second fiber end EG2, made incident on the rely lens ML. The signal light GL is made incident on the MEMS mirror unit 612b, which is the scan unit of the scanning optical system 612, with a divergence state of a light beam adjusted in the relay lens ML. The MEMS mirror unit 612b scans the virtual-image forming member 20, which is the half mirror, using the signal light GL as the scanning lights SL. Consequently, a virtual image is formed and the image lights PL for causing the wearer to recognize the virtual image is led to the eye EY of the wearer.

In this embodiment, the combined-light forming unit 611a, which is a device that substantially forms the image lights PL, is arranged on the ear EA side rather than the nose NS side or the eye EY side. Only the scanning optical system 612 is arranged in the periphery of the nose NS. The modulated signal light GL is propagated from the combined-light forming unit 611a to the scanning optical system 612. Therefore, it is possible to disperse the weight of the entire virtual image display device 600 and adjust the balance of the center of gravity. Consequently, the feeling of the weight of the virtual image display device 600 on the wearer is reduced to enable more comfortable viewing. Since the optical fiber FB is arranged along a not-shown frame, it is possible to arrange the frame less conspicuously in design.

In the above explanation, the combined-light forming unit 611a is arranged on the ear EA side. However, if the length and the shape of the optical fiber FB are changed as appropriate, it is also possible to arrange the combined-light forming unit 611a in a place other than the ear EA side. Consequently, it is possible to increase a degree of freedom of design of the entire virtual image display device 600.

The invention is not limited to the embodiments. It is possible to carry out the invention in various forms without departing from the spirit of the invention.

In the above explanation, the diode laser light sources or the LED light sources are used as the light sources. However, the light sources may be light sources other than the above such as organic ELs.

In the virtual image display device 100 and the like according to the embodiments, the light emitting device 10 and the like are provided to correspond to both the right and left eyes. However, the light emitting device 10 and the like may be provided for one of the right and left eyes to allow the wearer to view an image with one eye.

The entire disclosure of Japanese Patent Application No. 2012-041230, filed Feb. 28, 2012 is expressly incorporated by reference herein.

What is claimed is:

1. A virtual image display device comprising:
a signal-light modulating unit configured to emit a signal light modulated according to an image;
a scanning optical system configured to scan the signal light made incident from the signal-light modulating unit and emit the signal light as scanning light; and
a virtual-image forming member configured to receive irradiation of the scanning light from the scanning optical system and form a virtual image, wherein
the scanning optical system is located closer to a nose side than an eye of a wearer during wearing of the virtual image display device, and
the virtual-image forming member is arranged to be located in front of the eye of the wearer and further on a far side than the scanning optical system with respect to the wearer during wearing of the virtual image display device.

2. The virtual image display device according to claim 1, wherein the virtual-image forming member is arranged in a state in which the virtual-image forming member inclines in a direction from the nose side to an ear side of the wearer during wearing of the virtual image display device.

3. The virtual image display device according to claim 1, wherein the virtual-image forming member includes a semi-transparent reflection film that reflects the scanning light irradiated from the scanning optical system to form the virtual image, allows external light to pass, and enables observation of the virtual image formed by the scanning light and observation of the external light.

4. The virtual image display device according to claim 1, wherein the virtual-image forming member is a transparent base material in which a diffraction grating for forming the virtual image with the scanning light irradiated from the scanning optical system is arranged, the transparent base material allowing the external light to pass.

5. The virtual image display device according to claim 1, further comprising a nose pad section for wearing the virtual image display device in the nose of the wearer during wearing of the virtual image display device, wherein the scanning optical system is integrated with the nose pad section.

6. The virtual image display device according to claim 1, wherein the virtual image display device further includes an eye-width adjusting section configured to enable, according to eye width of the wearer, the scanning optical system and the virtual-image forming member to integrally move with respect to a position of the eye of the wearer during wearing of the virtual image display device.

7. The virtual image display device according to claim 1, wherein the signal-light modulating unit includes:

a combined-light forming unit configured to form, as signal light, combined light obtained by combining R light, G light, and B light; and an optical fiber configured to propagate the signal light formed by the combined-light forming unit to the scanning optical system.

8. The virtual image display device according to claim 7, wherein, in the signal-light modulating unit, the combined-light forming unit is arranged in a position corresponding to an ear side, and the optical fiber extends along a path from a periphery of the ear to a periphery of the nose through a periphery of the eye along a face shape of the wearer during wearing of the virtual image display device to propagate the modulated signal light from the combined-light forming unit to the scanning optical system.

9. The virtual image display device according to claim 1, wherein the scanning optical system includes a MEMS scanner configured to irradiate the signal light, a state of a light beam of which is adjusted, to the virtual-image forming member as the scanning light.

* * * * *